July 22, 1924.
T. R. HASLEY
WHEEL
Filed Dec. 2, 1921   2 Sheets-Sheet 1
1,502,632
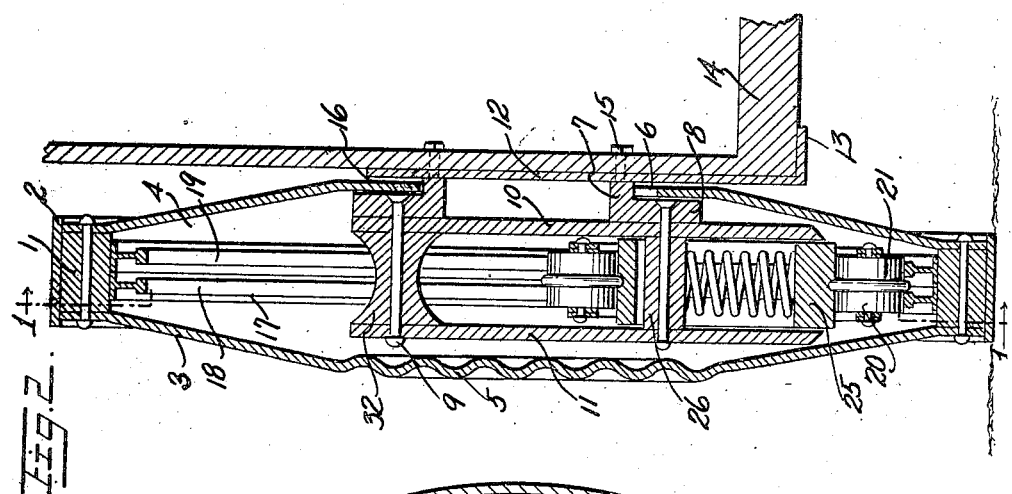
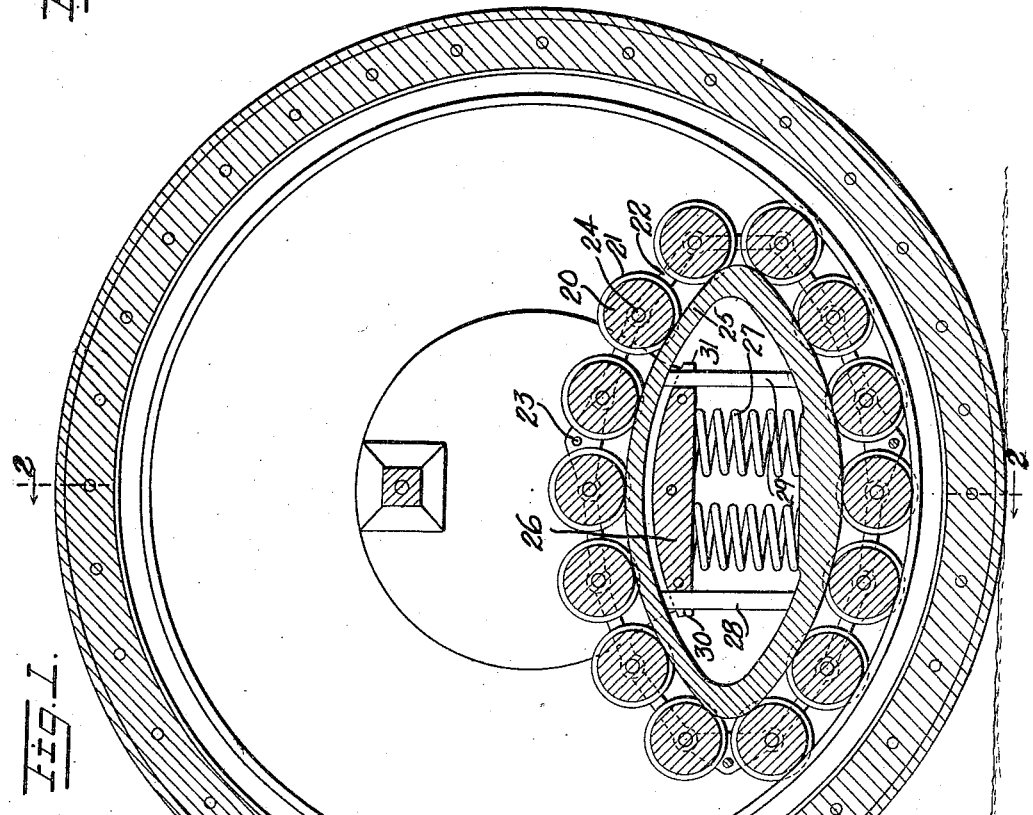
WITNESSES
H. T. Walker
A. L. Kitchin
INVENTOR
T. R. Hasley
BY
ATTORNEYS July 22, 1924.
T. R. HASLEY
WHEEL
Filed Dec. 2, 1921
1,502,632
2 Sheets-Sheet 2
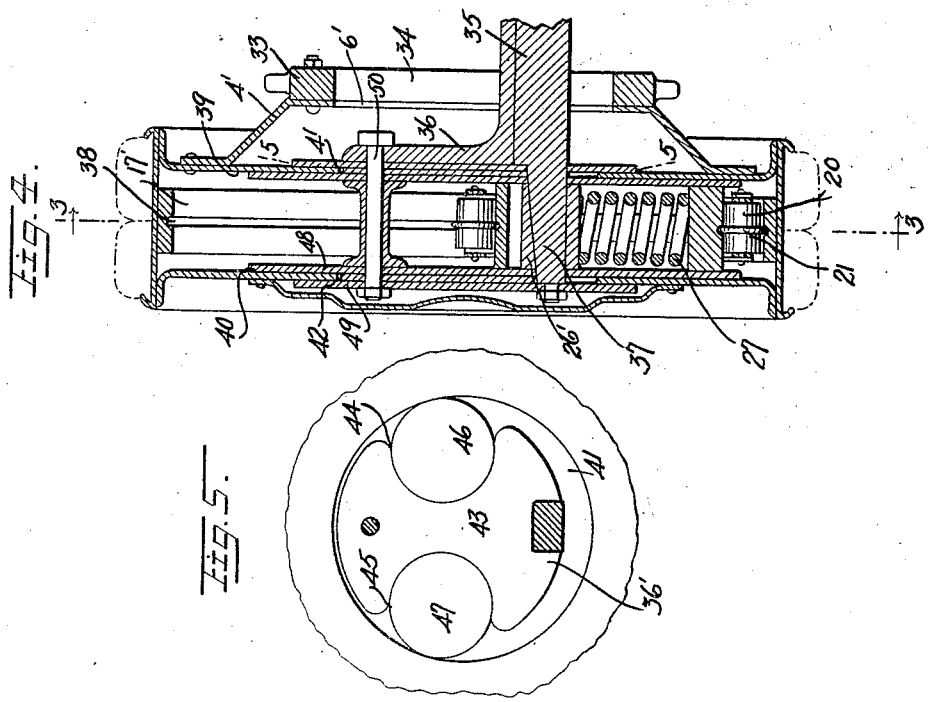
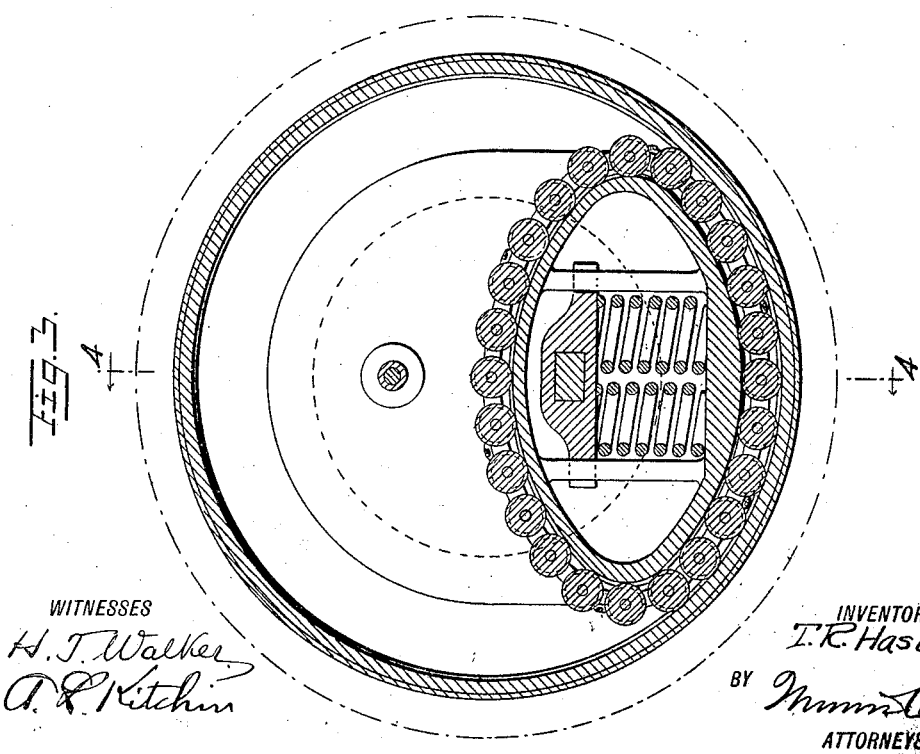
WITNESSES
H. T. Walker
A. L. Kitchin
INVENTOR
T. R. Hasley
BY
ATTORNEYS Patented July 22, 1924.

1,502,632

UNITED STATES PATENT OFFICE.

THOMAS R. HASLEY, OF MENOMINEE, MICHIGAN.

WHEEL.

Application filed December 2, 1921. Serial No. 519,490.

*To all whom it may concern:*

Be it known that I, THOMAS R. HASLEY, a citizen of the United States, and a resident of Menominee, in the county of Menominee and State of Michigan, formerly a resident of St. Louis, in the State of Missouri, have invented a new and Improved Wheel, of which the following is a full, clear, and exact description.

This invention relates to an improved wheel and has for an object to provide practical means of combining the function of an ordinary wheel and an endless train of large anti-friction members disposed to carry a load and thereby reduce friction.

Another object of the invention is to provide a wheel in which an annular track is provided associated with anti-friction members operating on the track and formed to receive the load.

An additional object of the invention is to provide a wheel constructed so that the center of gravity of the load may be mounted at a high or low point in respect to the wheel.

A still further object of the invention is to provide a wheel which will take up shocks through the action of springs while applying the method of slowly moving very heavy loads on rollers.

In the accompanying drawings—

Figure 1 is a vertical sectional view through Figure 2 approximately on line 1—1.

Figure 2 is a vertical sectional view on line 2—2 of Figure 1, the same disclosing one embodiment of the invention as the same will appear when in use.

Figure 3 is a sectional view through Figure 4 on line 3—3.

Figure 4 is a view similar to Figure 2 but taken on the section line 4—4 of Figure 3.

Figure 5 is a fragmentary sectional view through Figure 4 approximately on line 5—5.

Referring to the accompanying drawings by numeral, 1 indicates a felly which may have a rim 2 secured thereto in any desired manner. Bolted or otherwise rigidly secured to the felly 1 are side plates 3 and 4, said side plates being preferably of metal and arranged to thoroughly cover and protect the interior parts of the wheel in addition to the side plate 4 performing other functions. The plate 3 acts as stiffening means for the felly 1 and if desired, may have a round or corrugated portion 5 in the center while the plate 4 is provided with an aperture or opening 6 centrally through which the tubular member 7 extends, said tubular member acting as a form of hub. An annular flange 8 is preferably formed integral with the hub or tubular member 7 and carries a number of bolts or rivets 9 which act as means for rigidly clamping the side plates 10 and 11 as well as other parts rigidly to the flange 8. A supporting plate 12 is secured in any desired manner to the hub 7, said plate having a horizontal section 13 at the lower end so as to receive a container or other load 14. If desired, the bolts 15 for securing the plate 12 in place could extend through the container 14 whereby it would be bolted directly to the hub 7. If desired, the plate 12 could be eliminated completely and the container 14 bolted directly to the hub, said bolting action making it feasible to arrange the load any height in respect to the wheel as there are no axles necessary in this construction.

It will be noted that the flange 8 and plate 12, when associated with the hub 7, form an annular groove 16 into which the plate 4 extends (Fig. 2) whereby the plate 4 may take up all end thrust. The thickness of the plate 4 is properly proportioned in respect to the groove 16 to permit an oil filament on each side of that part of the plate in the groove and by reason of the large surfaces involved, the end thrust will be taken up without squeezing the oil out of the groove.

Connected to the felly 1, is a run-way 17 which is provided with spaced supporting surfaces 18 and 19, said run-way being welded or otherwise rigidly secured to the felly so that the supporting surfaces 18 and 19 will always be held in proper place for receiving the anti-friction members 20, which members are in the form of rollers and provided with guiding webs 21. The web 21 is not intended to take up end thrust but merely acts as a guide for holding the rollers in proper place and maintaining a proper alignment. These rollers are connected by suitable links 22, which links are also held in proper alignment by suitable connecting rods 23 which may be connected with the links at suitable intervals or may be secured to each link. The pivotal pins 24 connecting the links, act as the axles of the rollers 20 whereby the rollers may freely and easily act on the surfaces 18 and 19 and also pass around the elliptical guiding frame 25. This guiding frame is supported by the rollers and is held against movement by the load supporting block 26 which is bolted or riveted to the plates 10 and 11 and to the flange 8 by the rivets 9. This block rests upon the springs 27, which springs may be of any suitable number and kind. Pins 28 and 29 are connected with the frame 25 and fit into suitable notches 30 and 31 in block 26 whereby said block may freely move up and down and at the same time act to hold the frame in proper position.

Co-acting with the block 26 is a spacer block 32 whereby the plates 10 and 11 are held parallel and thereby guide the frame 25 in respect to the supporting block 26. It will be noted that when the load moves up and down, block 26, plates 10 and 11 and block 32 will also move up and down. As the load with its supporting wheel is moved along, said load is carried by the block 26 which transmits the weight to the frame 25 and as said frame rests upon the rollers 20, the frame may readily pass over said rollers while the rollers in turn will pass over the supporting surfaces 18 and 19 carried by the felly 1.

By reason of this construction and arrangement of parts, not only may the load be properly, and if desired, resiliently supported, but the wheel may be of any size. A wheel having a large diameter is desirable as it will not move downwardly into small depressions but will pass over said depressions and give a more easy riding action. It will be noted that the springs 27 have been shown as supporting the load and this ordinarily is desirable in order to give a resilient support, though if it should be necessary or desirable under special circumstances the springs could be eliminated and the load connected directly with the frame 25. This will give the same bearing surface on the rollers and the same desirable features of permitting the load to be mounted high or low as well as permitting the use of a wheel having a great diameter.

Where it is desired to drive the wheel so that the wheel will become a power wheel in addition to a traction wheel, a slight change is preferable as illustrated in Figures 3 to 5. In this form of the invention, the same inventive idea is present with slight changes to produce a practical construction for driving purposes. As shown in Figure 4, plates 39 and 40 perform the same functions as plates 3 and 4 of Figure 2 but plate 39 is formed with a large boss to which a sprocket wheel 33 is secured, said sprocket wheel having a large opening 34 in the center registering with the opening 6' of plate 4'. In this form of the invention instead of having the hub 7, an axle structure 35 is used provided with an upstanding bracket 36 either independent or integral with the axle and a supporting extension 37 projecting into the block 26'. Also, in this form of the invention the track or guide-way 17' is formed in one piece and provided with an annular groove 38 accommodating the web 21 of the rollers 20. The side plates 39 and 40 are provided with large round bores 41 and 42 for accommodating the respective plates 43 (Fig. 5), said plates having arc-shaped sockets 44 and 45 for receiving the circular disks 46 and 47. The parts are so proportioned that when there is no load on the wheel, the block 26' and associated parts will move upwardly under the action of the springs 27 until the disks 46 and 47 are pressing against the respective edges of bores in plates 39 and 40. These circular disks are free to revolve when touched by edge of bores and their office is to reduce friction while maintaining the relative vertical position of a plane passing through the center of the wheel and the center of frame 25 and to limit the upward movement of block 26 under the action of the springs 27.

The plates 43 and their respective disks 46 and 47 are held in proper position by the respective guard plates 48 and 49 carried by the bolt 50. It will be noted that in this form of the invention, as well as in the form shown in Figure 1, the weight is applied to the wheel below the axis of the felly and, consequently, there will be no top-heavy tendency.

What I claim is:—

1. In a wheel of the character described, a separate traction member, a frame arranged in said traction member, anti-friction means carried by the frame and resting on said traction member, spring means carried by said frame, a load carrying member extending into said frame and resting on said spring means, said load carrying member being formed with means for laterally guiding said frame and further means for guiding the traction member.

2. In a wheel of the character described, a circular traction member formed with a pair of annular tracks in its inner circumference and presenting at each side a closure plate, one of said closure plates being opened in its center, a hub member carrying a load extending through said opening within said wheel, a pair of plates carried by said hub, members interposed between said plates for spacing one from the other, an elliptical frame arranged between said plates, a plurality of rollers surrounding said frame, each formed with an annular rib adjacent its medial line to be accommodated between said annular tracks arranged around said frame and means including springs interposed between said frame and one of said spacing members for resiliently supporting the hub.

3. In a wheel of the character described, a rim presenting an annular track in its inner face, a plate at each side of said rim for enclosing said track, one of said plates having a central opening, a hub member extending through said opening in the center of said wheel, a pair of spaced members secured to said hub, a frame arranged between said spaced members, a series of rollers surrounding said frame, and adapted to support said frame on said track, a supporting block secured to said spaced members and said hub and spring means interposed between said frame and said supporting block for resiliently supporting the hub.

4. In a wheel of the class described, a hub formed with a tubular portion and a radiating flange, a load member secured to said hub at one end thereof whereby an annular groove is formed between said flange and said load member, a pair of spaced plates secured to said hub, an elliptical frame guided by said plates, a plurality of rollers carried by said frame and surrounding the same, and a rim engaging said rollers for supporting the rollers, frame, hub and load member, said rim having a side plate accommodated in said groove whereby the rim will be maintained in alignment with said rollers.

THOMAS R. HASLEY.